Patented Dec. 9, 1952

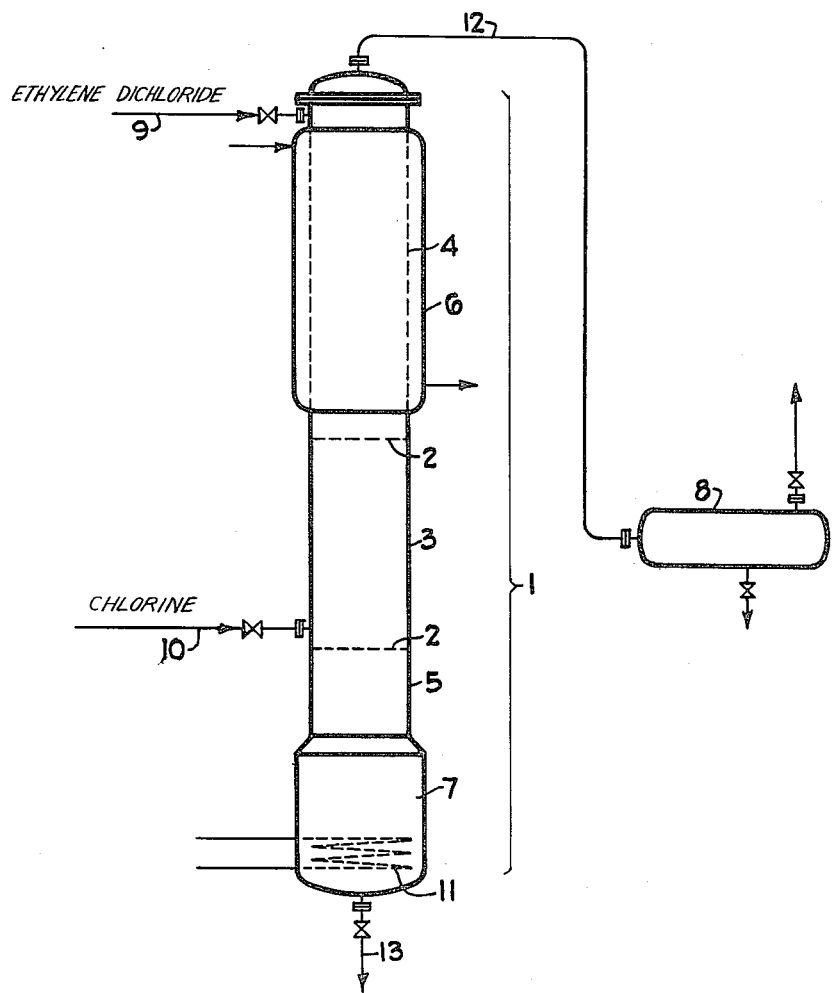

2,621,153

UNITED STATES PATENT OFFICE 2,621,153

PREPARATION OF TRICHLOROETHANE

Rudolf Herman Mettivier Meyer and Franciscus Johannes Fredericus van der Plas, Amsterdam, Netherlands, assignors to Shell Development Company, San Francisco, Calif., a corporation of Delaware Application March 31, 1947, Serial No. 738,378
In the Netherlands May 6, 1946

4 Claims. (Cl. 204—163)

This invention relates to a process for the preparation of trichloroethane. More particularly, the invention relates to a process for the preparation of 1,1,2-trichloroethane by the direct chlorination of 1,2-dichloroethane, i. e. ethylene dichloride.

More specifically the invention provides a practical and highly economical method for the production, from ethylene dichloride, of high yields of substantially pure 1,1,2-trichloroethane which comprises reacting ethylene dichloride and chlorine in the vapor phase under such conditions that the concentration of 1,1,2-trichloroethane in the reaction zone does not exceed about 15 mol per cent.

1,1,2-trichloroethane is a colorless liquid which is employed in a great many industrial applications. It is of particular importance at the present time in the production of vinylidene chloride which is used in the synthetic resin industry. Ethylene dichloride is a comparatively inexpensive source for the production of the 1,1,2-trichloroethane and various methods for the chlorination of the 1,2-dichloroethane to the trichloroethane have been proposed. The basic reaction for the processes may be described by the equation

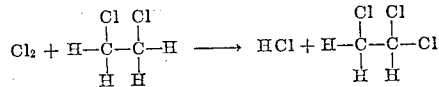

In some of the proposed methods the chlorination is carried out in the liquid phase in the presence of catalyst such as iron and antimony (German Patent No. 545,993). In other processes the chlorination of the 1,2-dichloroethane is carried out in the liquid phase under the influence of chemically active rays, taking into account a special proportion between the chlorine and the dichloroethane (U. S. Patent No. 2,174,737 and French Patent No. 804,491). In still other processes the chlorination is carried out in the vapor phase by leading the chlorine and dichloroethane into a bath of molten metal chloride (U. S. Patent No. 2,140,549).

The known methods for the production of the trichloroethane by chlorination of ethylene dichloride are not entirely satisfactory, however, for when there is a large percentage conversion of the ethylene dichloride to 1,1,2-trichloroethane the final product is always contaminated with large quantities of higher chlorinated products, especially the tetrachloroethanes. Expansive and cumbersome purification processes must be employed to separate such impurities from the trichloroethane before it may be used for many of its industrial applications, such as production of vinylidene chloride, which, in general, require at least a 96% purity for the trichloride. Furthermore, in many of the proposed methods large quantities of hydrogen chloride and often small quantities of chlorine contaminate the liquid reaction mixture necessitating the use of additional acid-resistant purification equipment. Accordingly, the expense incurred in the production of the substantially pure 1,1,2-trichloroethane by the known methods has greatly limited the use of the trichloroethane in many of its industrial applications.

It is an object of the invention, therefore, to provide a practical and highly economical method for the production of 1,1,2-trichloroethane by chlorination of ethylene dichloride. It is a further object of the invention to provide a method for the production of 1,1,2-trichloroethane from ethylene dichloride which yields a product relatively free from large quantities of the higher chlorinated products and thus eliminates the necessity of using additional purification procedures in the preparation process. It is a further object of the invention to provide a method for the production of 1,1,2-trichloroethane by chlorination of ethylene dichloride which enables an almost 100% conversion of the dichloride to 1,1,2-trichloroethane. It is a further object to provide a method for the production of 1,1,2-trichloroethane by chlorination of ethylene dichloride which eliminates the presence of hydrogen chloride in the liquid reaction mixture and thus avoids the necessity of employing acid-resistant purification equipment in the preparation process. Other objects of the invention will be apparent from the detailed description given hereinafter.

It has now been discovered that an almost 100% conversion of ethylene dichloride to 1,1,2-trichloroethane, substantially free of large quantities of higher chlorinated products, may be accomplished by the novel method of reacting ethylene dichloride and chlorine in the vapor phase under such conditions that the concentration of the 1,1,2-trichloroethane vapors in the reaction zone does not exceed about 15 mol percent. Such a vapor phase process in addition to decreasing the formation of higher chlorinated products, eliminates the presence of dissolved hydrogen chloride and small amounts of chlorine in the reaction mixture and final product and thus avoids the use of expensive acid-resistant purification equipment. The above-described process, therefore, provides an economical method for the production of 1,1,2-trichloroethane in a relatively pure form in which it is needed in its industrial applications.

The process of the invention is based upon the discovery that in the chlorination of ethylene dichloride to 1,1,2-trichloroethane the production of higher chlorinated products such as tetrachloroethanes is highly dependent upon the percentage of the trichloroethane already formed and present in the reaction mixture side by side with the unconverted dichloroethane. It has been discovered, for example, that in a conversion of about 15 mol per cent of ethylene dichloride to 1,1,2-trichloroethane, about 3 mol per cent of the total ethylene dichloride converted was used to form the higher chlorinated products. In a conversion of about 20 mol per cent to about 23 mol per cent of ethylene dichloride to trichloroethane the amount of the total ethylene dichloride converted to the higher chlorinated products increased rapidly to as high as 10 mol per cent to about 30 mol per cent. Varying the temperature, the physical state in which the reaction is conducted and various other reaction conditions failed to affect the rapid increase of formation of the higher chlorinated products after the conversion of the ethylene dichloride to the trichloride increased above 15 mol per cent.

To produce a high percentage conversion of ethylene dichloride to the trichloride and obtain a product free of the large quantities of the higher chlorinated product it is, therefore, essential that the 1,1,2-trichloroethane in the reaction mixture be removed as rapidly as it is formed and its concentration in the reaction zone be maintained at a level less than about 15 mol per cent. Reactions in which the concentration of the 1,1,2-trichloroethane in the reaction zone is maintained as low as 3 mol per cent have been found to produce products of the desired quality. Concentrations slightly lower than 3 mol per cent may be used but are difficult to maintain mechanically. In general, it has been found that reactions in which the concentration of the 1,1,2-trichloroethane is maintained at between about 8 mol per cent to about 12 mol per cent produce the more efficient results and such a range is therefore the more preferred concentration range to be maintained for the process of the invention.

Removal of the 1,1,2-trichloroethane from the reaction mixture as soon as it is formed and maintenance of the proper concentration of the trichloride in the reaction zone may be accomplished by any suitable method. As a preferred embodiment it is accomplished in the present invention by means of rectification. By rectification is meant any process in which components of chemical mixtures are separated by distillation by means of direct physical contact and heat exchange between ascending vapors and descending reflux liquid in any kind of a rectifying column.

To conduct the process of the invention by the preferred means of rectification, the chlorine and ethylene dichloride are introduced as vapors into the reaction zone situated in a rectifying column so that rectification takes place above and below the reaction zone. The chlorine and ethylene dichloride then react according to the equation cited hereinabove to form 1,1,2-trichloroethane. The trichloroethane formed is automatically extracted very rapidly from the reaction zone by condensation and passes down through the lower rectification zone to be collected as the final product. The temperature of the column is maintained at such a point as to cause the unconverted dichloroethane, condensed with the 1,1,2-trichloroethane, to be returned to the reaction zone through the lower rectification zone and there react again with the chlorine. The hydrogen chloride gas and the small quantities of unconverted chlorine gas are withdrawn through the upper rectification zone. The reflux and feed rates are adjusted so that the maximum concentration of the 1,1,2-trichloroethane in the vapors at any point in the reaction zone is less than about 15 mol per cent.

The rectifying apparatus may be of any suitable construction enabling intimate contact of the reactants, maintenance of the proper concentration of the 1,1,2-trichloroethane in the reaction zone and removal of the hydrogen chloride and chlorine gas separate from the 1,1,2-trichloroethane. A preferred structure for the rectifying apparatus comprises a rectifying column composed of three sections, the bottom rectifying zone, the reaction zone, and the top rectifying zone. The position of the reaction zone in the column is determined by the specific concentrations of the 1,1,2-trichloroethane vapors. Raschig rings, plates and/or other packing or contacting elements may or may not be present in the rectifying zones. The top of the rectifying column is joined to a cooler or reflux condenser which in turn is joined to a gas scrubber or other separating means to remove the hydrogen chloride gas and small quantities of unconverted chlorine gas. The bottom of the rectifying column is joined to a kettle which in turn is joined to a cooler to retain the 1,1,2-trichloroethane which is drawn off from the bottom of the kettle by means of a leveling apparatus. The apparatus is preferably constructed of or lined with glass; however, any other material which does not have a detrimental effect on any phase of the reaction such as, for example, stainless steel, tin, etc. may also be used. Iron should not be used for the construction of any part of the apparatus where there might be a possibility of formation of iron chloride as the iron chloride decomposes the trichloroethane to trichloroethylene and vinylidene chloride.

The dimensions of the preferred rectifying apparatus will depend upon the rate of production, the percentage conversion of the ethylene dichloride and the purity of the final product desired. We have, for example, attained an hourly production of about 5 kilograms of 1,1,2-tricholoroethane with a conversion of 100% of ethylene dichloride and a 97% purity of the trichloroethane employing a boiling kettle having a capacity of about 20 liters, a reaction zone having about 5.6 liters capacity and a bottom rectifying zone about 2 meters high (60 mm. diameter) filled with Raschig rings. The exact dimensions of the apparatus will depend upon the various conditions and may be readily determined for each individual case.

The attached drawing illustrates more or less diagrammatically a typical rectifying apparatus which may be used for the production of the 1,1,2-trichloroethane. This diagram is given only as an example and should not be considered as limiting the invention in any way. This apparatus consists mainly of: a rectifying column 1 with plates 2, divided into three sections, a middle section called the reaction zone 3, the upper and lower rectifying zones 4 and 5, a reflux condenser 6, a reboiler kettle 7, and a gas separator 8.

In the operation of the apparatus shown in the diagram the ethylene dichloride is introduced into the rectifying column at the top of the cooler through conduit 9. The chlorine is introduced as a vapor just above the bottom of the reaction zone of the rectifying column through conduit 10. The temperature of the apparatus is so regulated by means of the steam heater 11 so as to permit a rapid condensation of the 1,1,2-trichloroethane as it is produced in the reaction zone and the trichloride is collected in the boiling kettle 7. The unconverted ethylene dichloride that descends with the trichloroethane is taken back into the reaction zone as vapor to react with more of the chlorine. The hydrogen chloride gas formed in the reaction, as well as a slight amount of the chlorine, escapes through the top cooler and is taken to the gas separator through conduit 12. The finished product, 1,1,2-trichloroethane is drawn off to be put in containers through line 13.

The rate of introduction of the ethylene dichloride into the reaction zone of the rectifying column may vary over a wide range depending upon the desired percentage conversion and desired rate of production. In an apparatus described hereinabove designed to produce about 5 kilograms of 1,1,2-trichloroethane per hour the rate of introduction of the ethylene dichloride to maintain such a production would be about .1 kilogram per hour to about 4 kilograms per hour if we desired a substantially 100% conversion. Amounts greater than this, i. e. around 6 kilograms may be used to produce the same rate but would result in a smaller percentage conversion, i. e. around 67%.

The reaction between the chlorine and the ethylene dichloride is exothermic in character and the rate of introduction of the chlorine to the reaction zone should, theretofore, be regulated as to maintain the optimum reaction temperature. For example, to maintain the optimum temperature in the example cited above in which about 3.75 kilograms of ethylene dichloride per hour are introduced into the reaction zone, the rate of introduction should be maintained at about 2.5 kilograms per hour. The rate of the introduction of the chlorine will, therefore, usually depend upon the determined rate of introduction of the ethylene dichloride.

The optimum temperature range to be used in the process should be such as to enable almost complete condensation of the vapors in the top cooler as well as enabling the unconverted ethylene dichloride to be returned to the reaction zone and the condensed 1,1,2-trichloroethane to be withdrawn to the receiving kettle. In general, this requires that temperature of the liquid in the kettle be maintained at the boiling point of 1,1,2-trichloroethane which is 113° C. at 760 mm. mercury pressure. Under such conditions the temperature of the reaction zone will usually be about 85° C. Higher temperatures however may be used if desired or necessary.

Actinic light may be used to hasten the chlorination reaction if desired, however, the reaction proceeds at a convenient rate without the presence of such rays. Examples of suitable sources for the active rays are sun lamps, mercury vapor lamps, etc.

The production of the 1,1,2-trichloroethane by means of the rectification apparatus may be carried out in batch, semi-continuous or continuous manner. The process is well adapted to a continuous operation of large scale industrial production of the trichloride.

The above-described process results in yields of the 1,1,2-trichloroethane as high as 98% to 99% of the converted ethylene dichloride. The product contains usually less than about 3 mol per cent of the higher chlorinated products and in some cases very minute quantities of unconverted ethylene dichloride. No traceable amount of hydrogen chloride is present in the product as the HCl gas escapes readily through the top of the cooler. The 1,1,2-trichloroethane as removed from the boiling kettle is, therefore, ready to be used commercially without further purification.

To illustrate how the production of substantially pure 1,1,2-trichloroethane may be effected by means of the process of the invention the following examples are cited. However, the invention should not be considered as being limited in any way to the exact structure of rectifying apparatus used or the proportion of reactants or reaction conditions employed.

The rectifying apparatus used in the following examples consisted of a glass dish-column four meters high and having a diameter of 75 mm., a steel boiler placed under this column of capacity of 20 liters and a glass cooler at the top. At a level of about 2.5 and 3 m. above the bottom of the column there were placed two mercury-vapor lamps each with a capacity of 450 watts, which intensively illuminated the column over a length of about 1.5 m.

*Example I*

About 18 kilograms of a mixture, originating from a previous chlorination of 1,2-dichloroethane, and consisting of 2.5 mol per cent of dichloroethane, 95 mol per cent of 1,1,2-trichloroethane and 2.5 mol per cent tetrachloroethane, was added to the boiler of the above-described rectifying apparatus. The steam-heating of the boiler was adjusted in such a manner that in the top-cooler, where a complete condensation of the rising vapors occurred, 40 kilograms vapors per hour were condensed. Now, without altering this rate of heating the introduction of 1,2-dichloroethane and dry chlorine into the rectifying apparatus was started. The dichloroethane was pumped into the top cooler at a rate of 4 kilograms per hour. The chlorine was introduced into the column at the rate of about 2.7 kilograms per hour which prevented the temperature of the kettle going below the boiling point of 1,1,2-trichloroethane.

Under these conditions the chlorination reaction proceeded practically to completion and there was very little chlorine in the gas leaving the top cooler.

Under these conditions it was determined by analysis that the trichloroethane content of the vapor present in the reaction zone amounted to less than 10%.

The process described was continued for 110 hours. From the boiler was drawn off 544 kilograms of liquid, the composiiton of which was as follows:

|  | Mol per cent |
|---|---|
| Dichloroethane | 0.4 |
| 1,1,2-trichloroethane | 96.6 |
| Higher chlorinated ethanes (principally tetrachloroethane) | 3.0 |

This bottom product was free of acid and chlorine and could be used for the manufacture of vinylidene chloride without further purification.

Example II

A mixture of ethylene dichloride and 1,1,2-trichloroethane was added to the boiler of the above-described rectifying apparatus and the temperature adjusted so that there would be a rapid condensation of the vapors rising in the top cooler. Without altering the rate of heating ethylene dichloride was introduced at the rate of .6 kilogram per hour and the chlorine introduced at the rate of about .3 kilogram per hour which prevented the temperature of boiler from going below B. P. of 1,1,2-trichloroethane. The introduction of the reactants was continued for about three and a half hours after which it was stopped and the reaction allowed to be carried to completion.

Analysis of the trichloroethane content in the reaction zone vapors showed it to be less than about 12 mol per cent.

At the end of the reaction an analysis of the product showed a 98 per cent yield of 1,1,2-trichloroethane based on the weight of the chlorine used and the product contained less than about two and one-half mol per cent of the higher chlorinated products.

Example III

A mixture of ethylene dichloride and 1,1,2-trichloroethane was added to the boiler of the above-described rectifying apparatus and the temperature adjusted so that there would be a rapid condensation of the vapors rising in the top cooler. Ethylene dichloride was introduced into the reaction zone at the rate of about 300 grams per hour and the chlorine was introduced at about 280 grams per hour for about 5 hours. During the reaction the concentration of the 1,1,2-trichloroethane in the reaction zone did not rise above about 15 mol per cent.

Analysis of the final product indicated that it contained no hydrogen chloride gas and only about 2 mol per cent of the higher chlorinated products.

We claim as our invention:

1. A process for producing 1,1,2-trichloroethane which comprises reacting ethylene dichloride and chlorine in the vapor phase, in the presence of actinic light, in a reaction zone situated in a rectifying column wherein rectification takes place above and below the reaction zone, and applying a reflux to the said column, the reflux rate and rates of introducing the ethylene dichloride and chlorine being so adjusted that the concentration of the 1,1,2-trichloroethane in the vapors in the reaction zone lies between 8 mol per cent and 12 mol per cent.

2. A process for producing 1,1,2-trichloroethane which comprises reacting ethylene dichloride and chlorine in the vapor phase, in the presence of actinic light, in a reaction zone situated in a rectifying column wherein rectification takes place above and below the reaction zone, and applying a reflux to the said column, the reflux and feed rates being so adjusted that the concentration of 1,1,2-trichloroethane in the vapors at any point in the reaction zone is less than 15 mol per cent.

3. A process for producing 1,1,2-trichloroethane which comprises reacting ethylene dichloride and chlorine in the vapor phase in a reaction zone situated in a rectifying column wherein rectification takes place above and below the reaction zone and applying a reflux to the said column, the reflux and feed rates being so adjusted that the concentration of 1,1,2-trichloroethane in the vapors at any point in the reaction zone does not exceed 15 mol per cent.

4. A process for producing 1,1,2-trichloroethane comprising reacting ethylene dichloride and chlorine in the vapor phase in a reaction zone situated in a rectifying column wherein rectification takes place above and below the reaction zone, applying a reflux to the said column, and adjusting the reflux rate and rates of introducing ethylene dichloride and chlorine so that the concentration of 1,1,2-trichloroethane in the vapors in the reaction zone remains between 3 mol per cent and 15 mol per cent.

RUDOLF HERMAN METTIVIER MEYER.
FRANCISCUS JOHANNES FREDERICUS
VAN DER PLAS.

REFERENCES CITED

The following references are of record in the file of this patent:

UNITED STATES PATENTS

| Number | Name | Date |
| --- | --- | --- |
| 1,246,739 | Gibbs et al. | Nov. 13, 1917 |
| 1,723,748 | Primrose | Aug. 6, 1929 |
| 2,140,549 | Reilly | Dec. 20, 1938 |
| 2,174,737 | Coleman et al. | Oct. 3, 1939 |
| 2,461,142 | Cass | Feb. 8, 1949 |